United States Patent [19]
Hata

[11] Patent Number: 5,113,693
[45] Date of Patent: May 19, 1992

[54] ROTATIONAL POSITION DETECTING APPARATUS WITH A SIGNAL GENERATOR

[75] Inventor: Toshiaki Hata, Himeji, Japan

[73] Assignee: Mitsubishi Denki Kabushiki Kaisha, Tokyo, Japan

[21] Appl. No.: 585,470

[22] Filed: Sep. 20, 1990

[30] Foreign Application Priority Data

Sep. 22, 1989 [JP] Japan .................. 1-110334[U]

[51] Int. Cl.⁵ .......................................... G01M 15/00
[52] U.S. Cl. ............................. 73/118.1; 250/231.14
[58] Field of Search ................................ 73/118.1; 250/231.13–231.18; 356/375

[56] References Cited

U.S. PATENT DOCUMENTS

| | | | |
|---|---|---|---|
| 4,145,608 | 3/1979 | Shirasaki et al. | 250/231.14 |
| 4,700,062 | 10/1987 | Ernst | 250/231.18 |
| 4,866,268 | 9/1989 | Tang et al. | 250/237 G |

FOREIGN PATENT DOCUMENTS

| | | |
|---|---|---|
| 133607 | 10/1981 | Japan . |
| 14012 | 1/1983 | Japan . |
| 142203 | 6/1988 | Japan . |

*Primary Examiner*—Robert Raevis
*Attorney, Agent, or Firm*—Sughrue, Mion, Zinn, Macpeak and Seas

[57] ABSTRACT

An LED 103 and a photodiode 104 of a crank angle detector confront one another across a gap G', through which a plate 102 rotates. The LED and photodiode communicate through respective housing windows 111 when a slit 110 in the plate passes between them. The windows and the slit are sector-shaped, with concentric inner and outer edges, and radially oriented side edges. These configuration steepen the leading and trailing edges of the photodiode output, thus enhancing the detection accuracy.

12 Claims, 6 Drawing Sheets

ROTATIONAL POSITION DETECTING APPARATUS WITH A SIGNAL GENERATOR

BACKGROUND OF THE INVENTION

The present invention relates to a rotational angle detecting apparatus with a signal generator such as a crank angle detecting apparatus for an internal combustion engine in which the output signal of the signal generator, which is generated in synchrony with the rotation of a rotating shaft such as an engine crankshaft, is converted or waveform shaped into a square pulse signal representative of a predetermined rotational position of the rotating shaft. More specifically, it relates to a rotational position detecting apparatus in which the conversion efficiency of the output signal or the signal generator is improved so as to enhance the detection accuracy and reliability.

Generally, various operations such as ignition, fuel injection, etc., of an internal combustion engine for vehicles are controlled based on the rotational position or crank angle of the engine crankshaft. For example, ignition timing is controlled such that ignition takes place at a specific rotational position of the crankshaft. To this end, a rotational position detecting apparatus is employed for precisely detecting the rotational position or crank angle of the crankshaft.

A typical example of such a rotational position detecting apparatus is illustrated in FIGS. 6 through 11. As shown in FIG. 6, a rotating shaft 1, which is operatively connected with the crankshaft (not shown) of an internal combustion engine, is rotatably supported by a housing 9 through a bearing 9a. A rotating plate 2 is fixedly mounted on the rotating shaft 1 for integral rotation therewith. As shown in FIG. 7, the rotating plate 2 has a plurality of arcuate or sector-shaped slits 10 formed therein. The slits 10, the number of which corresponds to that of cylinders of the engine, are disposed on a circle around the axis of the rotating shaft 1 at locations circumferentially spaced from each other at substantially the same intervals. In the illustrated example, the number of slits 10 are four for a four-cylinder internal combustion engine.

A light emitting diode 3 and a light sensor 4 in the form of a photodiode are disposed on the opposite sides of the rotating plate 2 in alignment with each other on the circle on which the slits 10 in the rotating plate are disposed. The light emitting diode 3 and the light sensor 4 are fixedly supported by a holder 5 which is formed of a resin.

As clearly illustrated in FIGS. 8 and 9, the holder 5 includes a pair of support members 5a, 5a which are disposed in a confronting relation with each other and integrally connected with each other with a gap formed therebetween in which a portion of the rotating plate 2 is inserted. Each of the support members 5a, 5a has a generally cylindrical recess or socket 5b formed therein for receiving a corresponding light emitting diode 3 or a corresponding light sensor 4. Each of the recesses 5b is cylindrical or rectangular in vertical section. As shown in FIGS. 8 and 10, a rectangular-shaped window 11 is formed through the bottom portion of each cylindrical recess 5b so as to allow the light emitted from the light emitting diode 3 to reach the light sensor 4 after passing therethrough.

A circuit board 7 is mounted on an annular mounting plate 7a in the housing 9 and has an electronic circuit which is connected through wiring to the light emitting diode 3 and the light sensor 4 for driving the light emitting diode 3 and receiving an electric signal E from the light sensor 4. The electronic circuit of the circuit board 7 operates to shape the waveform of the electri signal E from the light sensor 4 into an appropriate pulse signal P.

The circuit board 7, the mounting plate 7a and a part of the holder 5 are received in a protective casing 8 which is received in and secured to the housing 9.

As illustrated in FIG. 11, the electronic circuit of the circuit board 7 includes a waveform shaper circuit having a comparator 20 which compares the electric signal E from the light sensor 4 with a reference voltage ER and generates a pulse signal P. The waveform shaper circuit includes a resistor 12 which is connected in series between the light emitting diode 3 and ground, a resistor 13 which is connected in series between the light sensor 4 and ground with a junction between the light sensor 4 and the resistor 13 being connected to the positive input terminal of the comparator 20, a pair of serially connected shunt resistors 14, 15 which are connected between the power supply and ground and have a junction therebetween connected to the negative input terminal of the comparator 20 for supplying the reference voltage ER thereto, and a resistor 16 which is connected to the output terminal 21 of the comparator 20.

The operation of the above-described rotational position detecting apparatus will now be described with particular reference to the waveform diagram of FIG. 12 as well as the characteristic graph of FIG. 13.

The light emitting diode 3 is powered from the electronic circuit of the circuit board 7 and is thus operated to generate light toward the light sensor 4. The light from the light emitting diode 3 intermittently passes through or is interrupted by the rotating plate 2, so that the light sensor 4 receives the light from the light emitting diode 3 at timings at which one of the slits 10 passes between or comes into alignment with the pair of light emitting diode 3 and light sensor 4. The light sensor 4 converts the light thus intermittently received from the light emitting diode 3 into an electric signal E which has a magnitude proportional to the quantity or magnitude of the received light. The light sensor 4 outputs the electric signal E thus generated to the electronic circuit of the circuit board 7.

At this time, however, the quantity of light passing through one of the slits 10, which becomes aligned with the light emitting diode 3 and the light sensor 4, changes substantially in a trapezoidal form in accordance with the rotational angle θ of the rotating plate 2 and the planar configurations of the slits 10 and the windows 11 in the support members 5a, 5a of the holder 5, so the electric signal generated by the light sensor 4 also changes substantially in the trapezoidal form, as depicted by the solid line in FIG. 12. Since the quantity of light passing through one of the slits 10 gradually changes when the radially extending edges of each arcuate slit 10 cross or superpose the edges of each window 11 in the circumferential or rotating direction of the rotating plate 2 (i.e., upon the opening and closing of each slit 10 with respect to the windows 11), as shown in FIG. 10, the rising and falling edges of each trapezoidal pulse of the light sensor output signal E change in curved lines, as shown by the two-dots and dashed line in FIG. 12, and hence the rate of change of the electric signal E becomes small particularly in the vicinity of the reference voltage ER.

On the other hand, the quantity of light received by the light sensor 4 changes according to the length or distance of a gap G between the light emitting diode 3 and the light sensor 4 (see FIG. 9) in a manner as illustrated in FIG. 13, i.e., substantially in an inverse proportion to the gap distance G. Thus, the quantity of light received by the light sensor 4 increases as the gap distance G decreases. In this connection, however, the holder 5 is formed by resin molding, so it is difficult to reduce the thickness of each window 11 (i.e., the thickness of the bottom portion of each socket 5b) from the points of view of manufacturing techniques and physical strength thereof. Therefore, there is a certain limit against reduction in the gap distance G.

The comparator 20 in the electric circuit 7 compares the electric signal E from the light sensor 4 with the prescribed reference voltage ER, and generates a pulse signal P which changes into the high level when the electric signal E exceeds the reference voltage ER, as shown in FIG. 12. Thus, the pulse signal P represents the rotational angle (rotational position) θ of the rotating plate 2.

With the conventional rotational position detecting apparatus as constructed above, however, the gap distance G between the light emitting diode 3 and the light sensor 4 is relatively large, and hence the magnitude of the electric signal E generated by the light sensor 4 is limited, resulting in a low efficiency in the photo-electric conversion. In addition, due to an inconsistency in configuration between the edge portions of the widows 11 and those of the slits 10, the rate of change of the electric signal E at the rising and falling edges in the vicinity of the reference voltage ER is relatively small, that is, the electric signal E does not rise or fall sharply in the vicinity of the reference voltage ER. As a result, if the quantity of light emitted by the light emitting diode 3 changes due, for example, to variations in the temperature of the ambient atmosphere, variations in the voltage supplied to the light emitting diode 3, etc., or if noise is superposed on the electric signal E of the light sensor 4, the pulse signal P generated by the waveform shaper circuit of FIG. 11 is easily affected, resulting in reduction in the detection accuracy. Particularly, in the case where noise is input to the positive input terminal of the comparator 20, the comparator 20 may malfunction and the instant or timing at which the pulse signal P rises or falls may greatly fluctuate, causing an error in the detection of the rotational angle or position of the crankshaft.

Further, in the conventional rotational position detecting apparatus as described above, since light is transmitted from the light emitting diode 3 to the light sensor 4 through the rectangular-shaped windows 11 and the arcuate or sector-shaped slits 10, the rising and falling portions of the electric signal E generated by the light sensor 4 have a limited rate of change in the vicinity of the reference voltage level ER. Accordingly, there is a problem in that a slight change in the quantity of light due to noise, variations in temperature and the like could easily result in detection errors.

Moreover, since the configuration of each recess or socket 5b is cylindrical or rectangular in vertical section, there is a certain minimum limit to the required thickness of the bottom of the recess of each support member 5a from the standpoint of mechanical strength, so it is difficult to decrease the gap distance G between the light emitting diode 3 and the light sensor 4, and hence a sufficient quantity of light for detection could hardly be provided at the light sensor. This leads to a low efficiency in the conversion of the light, which has passed through a slit 10, into an electric signal E, thus posing the problem that an SN ratio is degraded, preventing the detection of the crank angle or rotational position θ of the crankshaft with a high degree of accuracy.

SUMMARY OF THE INVENTION

The present invention is intended to obviate the above-described problems of the conventional rotational position detecting apparatus.

An object of the present invention is to provide a novel and improved signal generator which generates an electric signal which has a relatively great rate of change so as to provide a pulse having a rising and a falling edge which sharply change particularly in the vicinity of a reference voltage level, i.e., at a low voltage level.

Another object of the present invention is to provide a rotational position detecting apparatus using an improved signal generator which is able to substantially reduce detection errors resulting from noise, variations in temperature or the like so as to improve the accuracy in the detection of the rotational positions of the crankshaft of an engine to a practical extent.

In order to achieve the above object, according to one aspect of the present invention, there is provided a signal generator comprising:

a rotating shaft;

a rotating plate mounted on the rotating shaft for rotation therewith, the rotating plate having a generally circumferential slit formed therein, the slit having a pair of edges which extend along radial lines passing through the center of rotation of the rotating plate;

a holder having a pair of first and second support members disposed so as to form a gap therebetween for receiving a part of the rotating plate, each of the first and second support members having a recess and a window adjacent the recess, the windows in the first and second support members being disposed in alignment with each other at locations on an orbital circle of the slit which is formed by the slit during rotation of the rotating plate, the window in the second support member having a pair of edges which extend along radial lines passing through the center of rotation of the rotating plate;

a light emitting element received in the recess in the first support member for emitting light toward the light sensor through the window in the first support member; and a light sensor received in the recess in the second support member for generating an electric signal when it receives the light from the light emitting element through the slit in the rotating plate and the window in the second support member.

Preferably, the window in the first support member has the same planar configuration as that of the window in the second support member.

Preferably, each of the windows in the first and second support members has a generally sector shape having a pair of edges which extend circumferentially of the rotating plate in a concentric relation with each other.

Preferably, the recess in the first support member is configured so as to conform to the outer shape of the light emitting element, and the recess in the second support member is configured so as to conform to the outer shape of the light sensor, whereby those portions of the first and second support members which surround the windows can be reinforced so as to reduce the thickness thereof and hence the distance between the light emitting element and the light sensor.

In cases where the light emitting element and the light sensor have a partially spherical-shaped head for emitting light and a partially spherical-shaped head for receiving light, respectively, the recesses in the first and second support members may, in one form, have inner bottom portions adjacent the windows configured into partially spherical shapes conforming to the corresponding spherical-shaped heads. In another form, the recesses in the first and second support members may have non-spherical bottom portions adjacent the windows for receiving the corresponding heads, the bottom portions being provided at their inside with reinforcement ribs which have their peripheral portions conforming to the corresponding spherical-shaped heads.

According to another aspect of the present invention, there is provided a rotational position detecting apparatus for detecting the rotational position of an engine crankshaft, the apparatus comprising:

a rotating shaft operatively connected with the crankshaft so as to rotate in synchrony with the rotation thereof;

a rotating plate mounted on the rotating shaft for rotation therewith, the rotating plate having a generally circumferential slit formed therein, the slit having a pair of edges which extend along radial lines passing through the center of rotation of the rotating plate, the edges respectively corresponding to a first and a second rotational position of the crankshaft;

a holder having a pair of first and second support members disposed so as to form a gap therebetween for receiving a part of the rotating plate, each of the first and second support members having a recess and a window adjacent the recess, the windows in the first and second support members being disposed in alignment with each other at locations on an orbital circle of the slit which is formed by the slit during rotation of the rotating plate, the window in the second support member having a pair of edges which extend along radial lines passing through the center of rotation of the rotating plate;

a light emitting element received in the recess in the first support member for emitting light toward the light sensor through the window in the first support member;

a light sensor received in the recess in the second support member for generating an electric signal when it receives the light from the light emitting element through the slit in the rotating plate and the window in the second support member; and an electric circuit for driving the light emitting element and shaping the waveform of the electric signal from the light sensor into a pulse signal which has a rising edge representative of the first rotational position of the crankshaft and a falling edge representative of the second rotational position of the crankshaft.

The above and other objects, features and advantages of the present invention will become apparent from the ensuing detailed description of a preferred embodiment of the invention taken in conjunction with the accompanying drawings.

DESCRIPTION OF THE PREFERRED EMBODIMENTS

The present invention will now be described in detail with reference to preferred embodiments thereof as illustrated in the accompanying drawings.

Figure 1A:
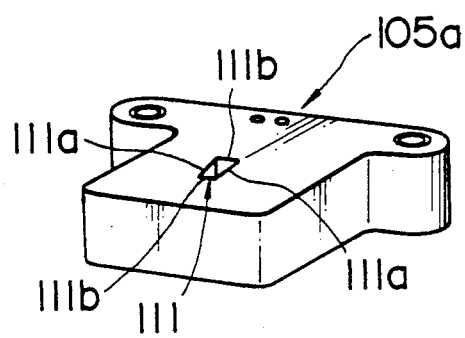
FIG. 1A is a perspective view of one of a pair of support members of a holder for holding one of a light emitting diode and a light sensor according to the present invention.
Figure 1B:
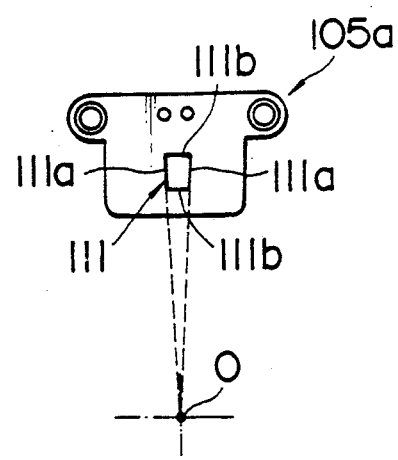
FIG. 1B is a plan view of the support member of FIG. 1A.
Figure 3:
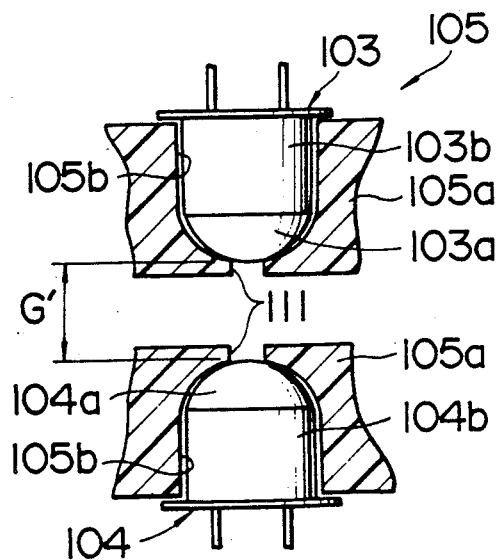
FIG. 3 is a vertical section of a part of the holder of FIG. 1A, showing the arrangement of the support members as well as the vertical sectional configurations of recesses or sockets for holding the light emitting diode and the light sensor.

FIGS. 1A, 1B and 3 illustrate a holder 105 for holding a light emitting diode 103 and a light sensor 104 constructed in accordance with a first embodiment of the present invention. As clearly seen from FIG. 3, the holder 105 is formed of a resin such as plastics and includes a pair of first and second support members 105a which are connected with each other through an unillustrated connecting member, as in the case of the conventional holder 5 illustrated in FIG. 6. The first and second support members 105a, 105a are disposed in a parallel relation with each other with a gap formed therebetween for receiving a part of a rotating plate 102 which is of the same construction as that of the conventional apparatus as shown in FIG. 7. That is, though not clearly illustrated, the rotating plate 102 has a plurality of arcuate or sector-shaped slits 110 formed therein, each of the slits 110 relating to a corresponding cylinder of a multi-cylinder internal combustion engine. Each of the sector-shaped slits 110 has a pair of opposed inner and outer circumferential sides or edges 110a, which extend circumferentially of the rotating plate 102, and a pair of opposed radial ends or edges 110b, which extend radially of the rotating plate 102. The inner circumferential edges 110a of the slits 110 are disposed on a first circle, which is concentric with the rotation axis O of the rotating plate 102, and the outer circumferential edges 110a of the slits 110 are disposed on a second circle which is concentric with and has a radius greater than the first circle.

Each of the first and second support members 105a has a recess or socket 105b formed therein which substantially conforms to the outer configuration of a corresponding light emitting diode 103 or light sensor 104. Specifically, in the example illustrated in FIG. 3, each of the light emitting diode 103 and the light sensor 104 is configured such that it has a generally cylindrical body 103b or 104b and a partially spherical head 103a or 104a. Thus, the recess or socket 105b in each of the support members 105a is similarly configured to have a cylindrical portion and a partially spherical bottom portion.

With this construction or configuration of the sockets 105b, the thickness of the partially spherical bottom portion of each of the first and second support members 105a gradually increases from the edges of a corresponding window 111, which will be described in detail later, toward the cylindrical portion of each socket 105b, so as to substantially improve the mechanical strength of the bottom portion. As a result, the thickness of the windows 111 (i.e., the thickness of the bottom portion of each support member 105a particularly around the edges of each window 111) can be made considerably thin as compared with that of the conventional windows 11, so it is possible to accordingly reduce the distance G' between the light emitting diode 103 and the light sensor 104. Therefore, the magnitude of the light received by the light sensor 104 can be made much greater than in the aforementioned conventional apparatus.

Further, each of the first and second support members 105a has the window or aperture 111 formed through the bottom thereof for passage of the light emitted by the light emitting diode 103. Preferably, the windows 111 in the support members 105a have the same configuration and size and are disposed in exact alignment with each other in a direction perpendicular to the surface of the rotating plate 102 which is disposed between the first and second support members 105a. The planar configuration of the windows 111 is generally in the form of a sector with respect to the central point or rotation axis O of the rotating plate 102, as clearly shown in FIGS. 1B and 2. Specifically, each of the windows 111 includes a pair of opposed radial sides or edges 111a, which extend radially of the rotating plate, i.e., in radial directions from the axis of rotation O of the rotating plate 102, and a pair of opposed circumferential sides or edges 111b, which extend circumferentially of the rotating plate 102. Although there are no particular restrictions on the configuration and length of the circumferential edges 111b as well as the radial length of the opposed radial edges 111a, it is preferable, from the points of view of increasing the mechanical strength of the support members 105a, particularly around their windows 111, as well as providing a maximum area of each slit 110 for passage of light therethrough, that the length of the radial edges 111a of each window 111 be at least to that of the radial edges 110a of each slit 110 in the rotating plate 102. In this case, the length of the circumferential edges 111b (or an angle included thereby) can be determined so as to provide a desired opening area for each window.

Figure 2:
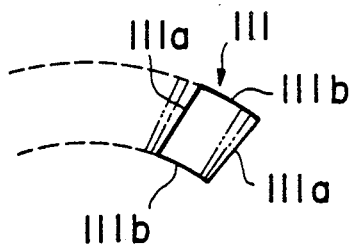
FIG. 2 is an explanatory view showing the operational relation between a window in each support member and a slit in a rotating plate during the rotation of the latter according to the present invention.
Figure 8:
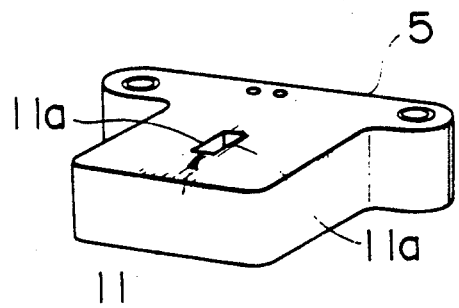
FIG. 8 is a perspective view of a part of a holder of FIG. 6.
Figure 9:
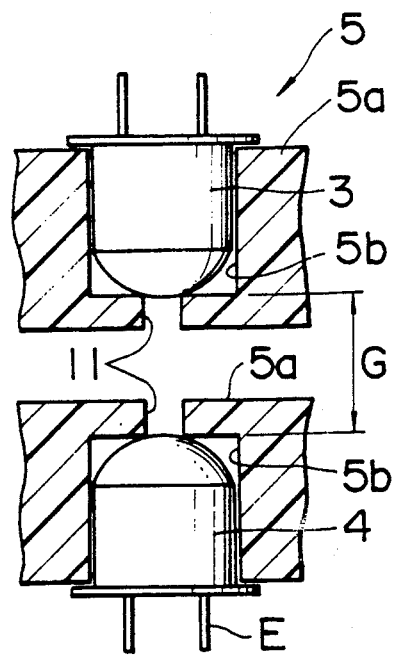
FIG. 9 is a view similar to FIG. 3, but showing the arrangement of the support members as well as the vertical sectional configurations of sockets of FIG. 6 for holding the light emitting diode and the light sensor.
Figure 10:
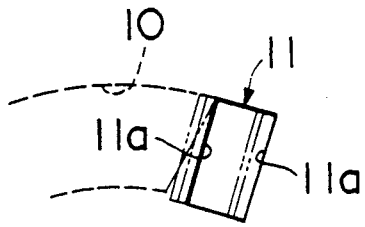
FIG. 10 is a view similar to FIG. 2, but showing the operational relation between a window in each support member and a slit in a rotating plate during the rotation of the latter according to the conventional apparatus of FIG. 6.

With the above configuration of the windows 111 in which they have radial edges 111a which extend along radial lines passing through the axis of rotation O of the rotating plane 102, the rate of change of the opening area of a slit 110 in the rotating plane 102 (i.e., the overlap area between the slit 110 and the windows 111 in the first and second support members 105a) upon crossing (i.e., entering or leaving) the radial edges 111a of the windows 111 during rotation of the rotating plane 102 becomes constant if the rotational speed of the rotating plane 102 is constant, as clearly shown in FIG. 2. As a result, the change rate ($\Delta E/\Delta \theta$) of the opening area of the sector-shaped slit 110 at the beginning and end of such a change is much greater with the sector-shaped windows 111 of the present invention than with the rectangular-shaped windows 11 of the aforesaid conventional apparatus as illustrated in FIGS. 8 and 10.

Figure 6:
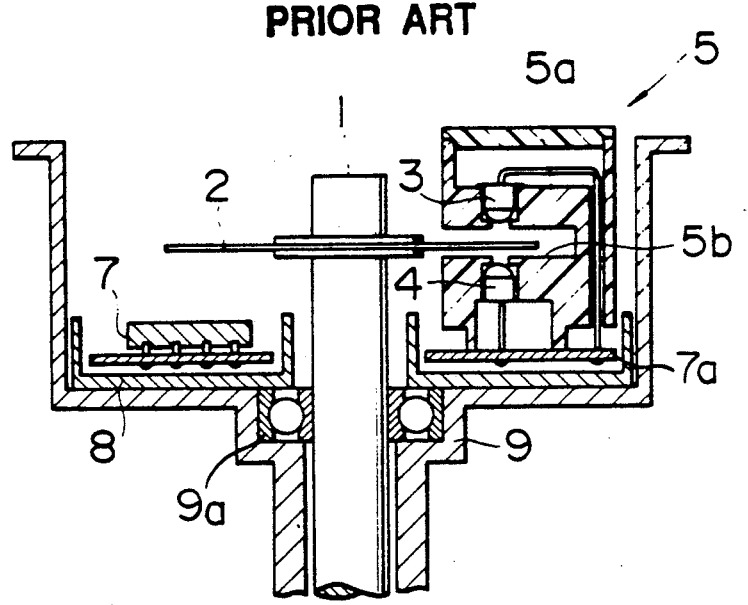
FIG. 6 is a vertical section of a conventional rotational angle detecting apparatus.
Figure 7:
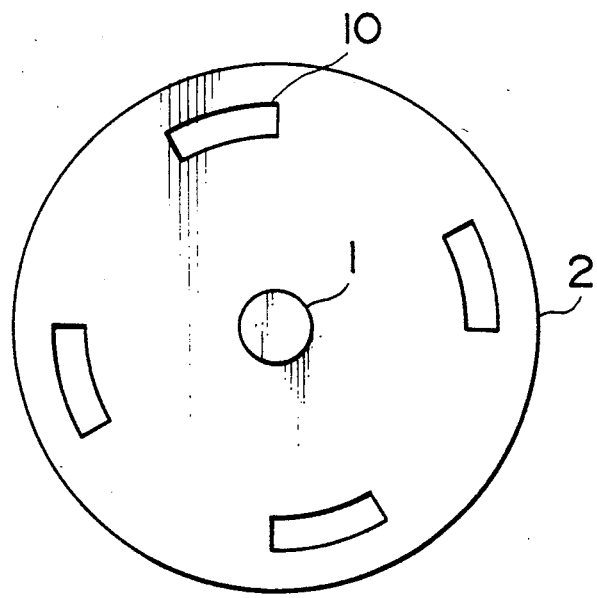
FIG. 7 is a plan view of a rotating plate of FIG. 6.
Figure 11:
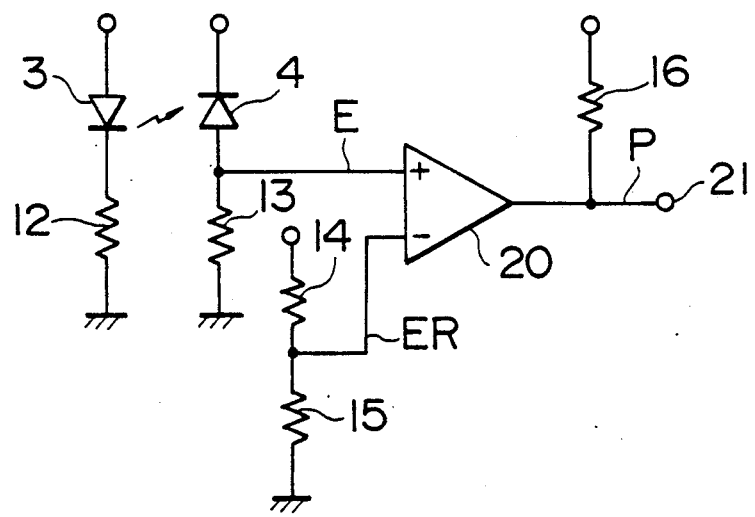
FIG. 11 is a circuit diagram of a waveform shaper of an electronic circuit incorporated in a circuit board of FIG. 6.
Figure 12:
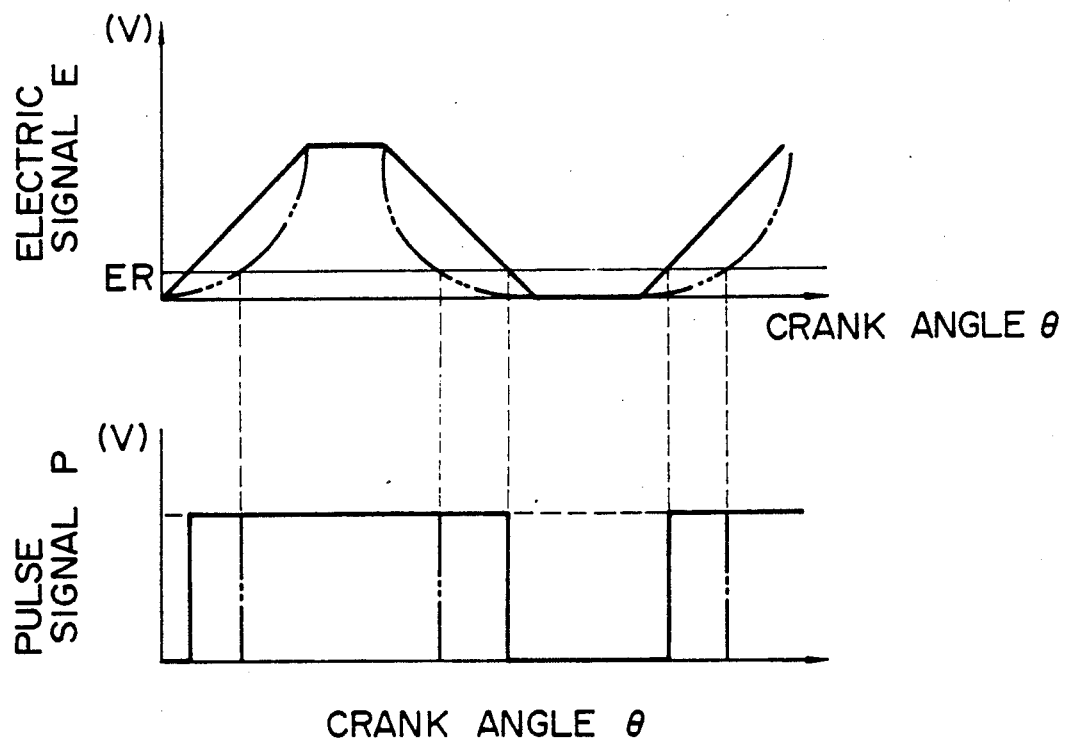
FIG. 12 is a view similar to FIG. 4, but showing the waveform of the electric signal E and that of the pulse signal P.
Figure 13:
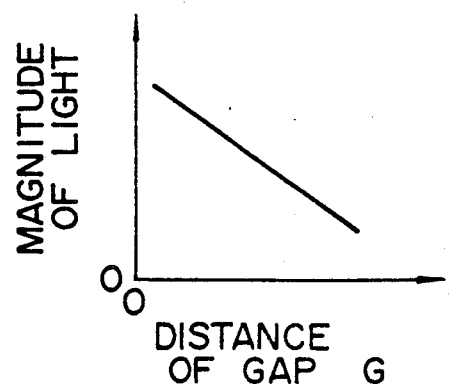
FIG. 13 is a graph showing the relation between the quantity of light generated by a light emitting diode and the distance of a gap G between the light emitting diode and the light sensor.

In addition to the above-described elements, the rotational position detecting apparatus of the present invention includes all the other elements of the conventional apparatus as illustrated in FIGS. 6, 7 and 11. The construction and arrangement of this embodiment other than the above are substantially similar to those of the conventional rotational position detecting apparatus, and hence omitted for clarity, conciseness and simplicity of explanation.

The operation of this embodiment will now be described in detail with particular reference to FIGS. 2, 4, 6, 7 and 11.

When one of the slits 110 in the rotating plate 102 comes between or in alignment with the opposed windows 111 in the first and second support members 105a during rotation of the rotating plate 102, the light issued from the light emitting diode 103 passes through the window 111 in the first support member 105a, the one of slits 110 and the window 111 in the second support member 105a, and reaches the light sensor 104 which then generates an electrical output signal E.

In this case, the rate of change of the magnitude of light received by the light sensor 104 is relatively great even at the beginning of opening the windows 111 and at the end of closing them by a slit 110 in the rotating plate 102 because the opposed radial edges 111a of the generally sector-shaped windows 111 are configured substantially similarly to those of each slit 110 in the rotating plate 102 so as to extend along radial lines which pass through the central point or rotation axis O of the rotating plate 102, as illustrated in FIG. 1A. Accordingly, the rising edge and the falling edge of the electric signal E generated by the light sensor 104 sharply change, as shown by the solid line in FIG. 4. In this case, the rate of change ($\Delta E/\Delta \theta$) of the electric signal E of this embodiment is by far greater particularly in the vicinity of a reference voltage ER, which is a waveform shaping voltage level, than that of the conventional apparatus which is shown by the dash and dotted lines in FIG. 4.

Figure 4:
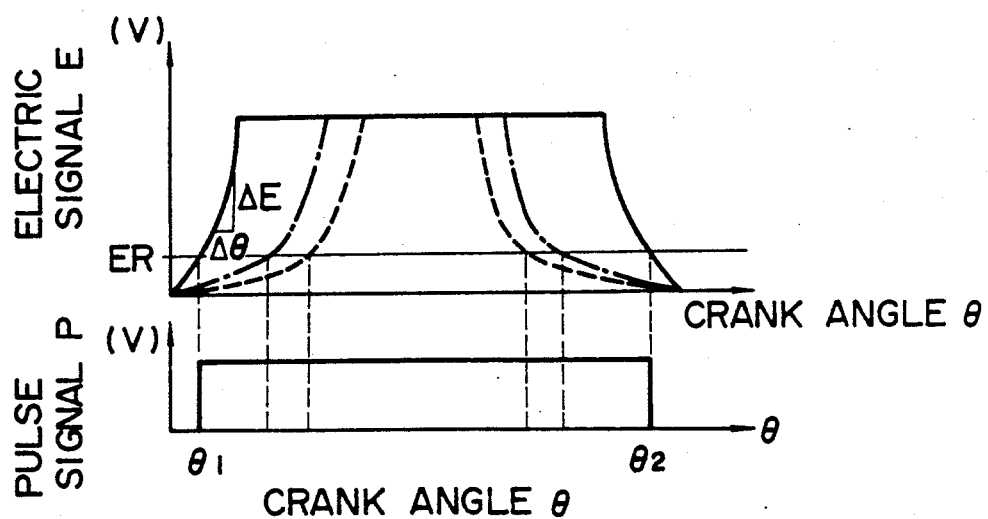
FIG. 4 is a waveform diagram showing the waveform of an electric signal E (indicated by the solid line) generated by the light sensor of FIG. 3 and the waveform of a pulse signal P generated by a waveform shaper circuit according to the present invention, as well as those (indicated by dash and dotted lines and the broken lines) generated by a light sensor and a waveform shaper circuit according to a conventional signal generator.

The electric signal E is supplied to the positive input terminal of the comparator 20 (FIG. 11) for comparison with the reference voltage ER imposed on the negative input terminal thereof. When the electric signal E is greater than the reference voltage ER, the comparator 20 generates an output signal P in the form of a square pulse which has a vertical rising edge occurring at a rotational angle or crank angle $\theta_1$ at which the rising edge of the electric signal E crosses the reference voltage ER, and a vertical falling edge occurring at a rotational angle or crank angle $\theta_2$ at which the falling edge of the electric signal E crosses the reference voltage ER, as shown in FIG. 4. Thus, the rising and falling edges of the pulse signal P substantially correspond to the starting and ending points, respectively, of the rising and falling edges of the electric signal E, i.e., they correspond to the crank angles or rotational positions $\theta_1$, $\theta_2$ of the unillustrated crankshaft at which the leading and trailing edges of the one of slits 110 in the rotating plate 102 become in exact alignment with one and the other, respectively, of the opposed radial edges of each window 111.

Accordingly, even if noise is superposed on the electric signal E at a level near the reference voltage ER of the comparator 20, there will result no substantial change or displacement in the crank angle $\theta$ of the rising and falling edges of the electric signal E at instants when the rising and falling edges of the electric signal E cross the reference voltage ER, as clearly seen from FIG. 4 in which the dashed lines represent the rising and falling edges of the conventional electric signal E generated with a conventional rectangular-shaped slit 10, which is appreciably affected by noise of the same voltage level. Thus, variations in the rising and falling edges of the pulse signal P can be suppressed to a substantial extent. As a consequence, in the event that the magnitude of light emitted by the light emitting diode 103 is caused to fluctuate due to variations in the temperature thereof, variations in the voltage supplied thereto, or the like, no substantial influence will be exerted on the pulse signal P.

In this manner, the generally sector-shaped planar configuration of the windows 111 serves to suppress the degradation in the output characteristic of the pulse signal P to a minimum level. In addition, reducing the distance of the gap G' between the light emitting diode 103 and the light sensor 104 as much as possible results in an increase in the magnitude of light received by the light sensor 104. This leads to an improvement in the S/N ratio of the electric signal E, which in turn improves the detection accuracy and reliability as well based on the pulse signal P.

Figure 5:
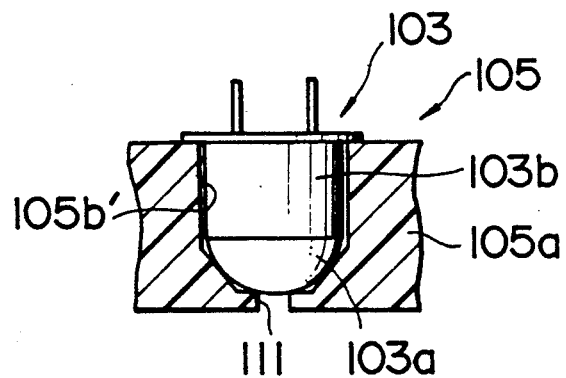
FIG. 5 is a vertical section of a part of a holder in accordance with another embodiment of the present invention.

Although in the above-described embodiment, the bottom portion of each socket 105b adjacent a corresponding window 111 is configured into a partially spherical shape so as to fully conform to the outer shape of the top portion of the light emitting diode 103 or the light sensor 104 in order to minimize the distance of the gap G', it may take other configurations such as a partially polygonal shape, as illustrated by numeral 105b' in FIG. 5, which have substantially the same effects as the partially spherical configuration.

Further, in place of a cylindrical and partially spherical shape which is most preferred for the purposes of the present invention, each socket 105b may take a generally cylindrical, rectangular-parallelopiped, polygonal-parallelopiped shape with its bottom portion having a plurality of reinforcement ribs inwardly extending from the inner surface thereof if there is no problem from the standpoint of mechanical strength of the holder 105. In this case, each of the reinforcement ribs preferably has a partially circular-, polygonal-, or stepwise-shaped peripheral edge which conforms to the partially spherical outer surface of the head of the light emitting diode 103 or the light sensor 104.

What is claimed is:

1. A signal generator comprising:
   a rotating shaft;
   a rotating plate mounted on the rotating shaft for rotation therewith, the rotating plate having a generally circumferential slit formed therein, the slit having a pair of edges which extend along radial lines passing through a center of rotation of the rotating plate;
   a holder having a pair of first and second support members disposed so as to form a gap therebetween for receiving a portion of the rotating plate, each of the first and second support members having a recess and a window adjacent the recess, the windows in the first and second support members being disposed in alignment with each other at locations on an orbital circle of the slit which is formed by the slit during rotation of the rotating plate, the window in the second support member having a pair of edges which extend along radial lines passing through the center of rotation of the rotating plate;
   a light emitting element received in the recess in the first support member for emitting light toward a light sensor through the window in the first support member; and
   a light sensor received in the recess in the second support member for generating an electric signal when it receives the light from the light emitting element through the slit in the rotating plate and the window in the second support member.

2. A signal generator as claimed in claim 1, wherein the window in the first support member has the same planar configuration as that of the window in the second support member.

3. A signal generator as claimed in claim 2, wherein each of the windows in the first and second support members has a generally sector shape having a pair of edges which extend circumferentially of the rotating plate in a concentric relation with each other.

4. A signal generator as claimed in claim 1, wherein the recess in the first support member is configured to conform to an outer shape of the light emitting element, and the recess in the second support member is configured to conform to an outer shape of the light sensor, whereby portions of the first and second support members which surround the windows can be reinforced so as to reduce the thickness thereof and hence the distance between the light emitting element and the light sensor.

5. A signal generator as claimed in claim 4, wherein the light emitting element and the light sensor have a partially spherical-shaped for emitting light and a partially spherical-shaped head for receiving light, respectively, and the recesses in the first and second support members have inner bottom portions adjacent the windows configured into partially spherical shapes conforming to the corresponding spherical-shaped heads.

6. A signal generator as claimed in claim 4, wherein the light emitting element and the light sensor have a partially spherical-shaped head for emitting light and a partially spherical-shaped head for receiving light, respectively, and the recesses in the first and second support members have non-spherical bottom portions adjacent the windows for receiving the corresponding heads, the bottom portions being provided at their inside with reinforcement ribs which have their peripheral portions conforming to the corresponding spherical-shaped heads.

7. A rotational position detecting apparatus for detecting the rotational position of an engine crankshaft, the apparatus comprising:
- a rotating shaft operatively connected with the crankshaft so as to rotate in synchrony with the rotation thereof;
- a rotating plate mounted on the rotating shaft for rotation therewith, the rotating plate having a generally circumferential slit formed therein, the slit having a pair of edges which extend along radial lines passing through the center of rotation of the rotating plate, the edges respectively corresponding a first and a second rotational position of the crankshaft;
- a holder having a pair of first and second support members disposed so as to form a gap therebetween for receiving a portion of the rotating plate, each of the first and second support members having a recess and a window adjacent the recess, the windows in the first and second support members being disposed in alignment with each other at locations on an orbital circle of the slit which is formed by the slit during rotation of the rotating plate, the window in the second support member having a pair of edges which extend along radial lines passing through the center of rotation of the rotating plate;
- a light emitting element received in the recess in the first support member for emitting light toward a light sensor through the window in the first support member;
- a light sensor received in the recess in the second support member for generating an electric signal when it receives the light from the light emitting element through the slit in the rotating plate and the window in the second support member; and
- an electric circuit for driving the light emitting element and shaping the waveform of the electric signal from the light sensor into a pulse signal which has a rising edge representative of the first rotational position of the crankshaft and a falling edge representative of the second rotational position of the crankshaft.

8. A rotational position detecting apparatus as claimed in claim 7, wherein the window in the first support member has the same planar configuration as that of the window in the second support member.

9. A rotational position detecting apparatus as claimed in claim 8, wherein each of the windows in the first and second support members has a generally sector shape having a pair of edges which extend circumferentially of the rotating plate in a concentric relation with each other.

10. A rotational position detecting apparatus as claimed in claim 7, wherein the recess in the first support member is configured to conform to an outer shape of the light emitting element, and the recess in the second support member is configured to conform to an outer shape of the light sensor, whereby those portions of the first and second support members which surround the windows can be reinforced so as to reduce the thickness thereof and hence the distance between the light emitting element and the light sensor.

11. A rotational position detecting apparatus as claimed in claim 10, wherein the light emitting element and the light sensor have a partially spherical-shaped head for emitting light and a partially spherical-shaped head for receiving light, respectively, and the recesses in the first and second support members have inner bottom portions adjacent the windows configured in partially spherical shapes conforming to the corresponding spherical-shaped heads.

12. A rotational position detecting apparatus as claimed in claim 10, wherein the light emitting element and the light sensor have a partially spherical-shaped head for emitting light and a partially spherical-shaped head for receiving light, respectively, and the recesses in the first and second support members have non-spherical bottom portions adjacent the windows for receiving the corresponding heads, the bottom portions being provided at their inside with reinforcement ribs which have their peripheral portions conforming to the corresponding spherical-shaped heads.

* * * * *